Patented May 30, 1933

1,911,719

UNITED STATES PATENT OFFICE

HUGO SCHWEITZER, WINFRID HENTRICH, AND KARL BURR, OF WIESDORF-ON-THE-RHINE, GERMANY, ASSIGNORS TO GENERAL ANILINE WORKS, INC., OF NEW YORK, N. Y., A CORPORATION OF DELAWARE

AROMATIC AMINO SULPHOCHLORIDES

No Drawing. Application filed February 12, 1930, Serial No. 427,988, and in Germany February 18, 1929.

The present invention relates to the manufacture of aromatic amino sulphochlorides and to the new products obtainable thereby, more particularly it relates to compounds of the probable general formula

wherein R stands for a radical of the benzene or naphthalene series which may be substituted by any substituents, such as halogen, alkyl, hydroxyl, phenyl, substituted phenyl etc, and $x$ stands for one of the numbers 1 and 2.

Our new compounds are prepared by causing chlorosulphonic acid to act on an amino sulphonic acid of the benzene or naphthalene series or a nuclear substitution product thereof. In carrying out our invention the aromatic amino sulphonic acid is introduced into chlorosulphonic acid while cooling, and the reaction mass is allowed to stand for a time ranging from about 1 hour to several days at a temperature between about 15° C. and about the boiling point of the reaction mixture, the time and temperature required depending on the amino sulphonic acid used as starting material. In some cases our new reaction leads not only to the amino sulphochloride of the amino sulphonic acid used as starting material, but more sulphochloride residues or even chlorine atoms enter the molecule.

From the reaction mixture, the new sulphochlorides are isolated by pouring the mixture onto ice. After recrystallization the sulphochlorides form colorless to yellow crystalline substances which are soluble in organic solvents and, when boiled with aqueous alkalies are saponified to form aromatic amino sulphonic acids. The new compounds may be used for the production of intermediate products for the manufacture of coal tar dyestuffs, for the synthesis of pharmaceutical products, for the manufacture of auxiliary materials for dyeing and printing and also for combating insect pests.

The following examples illustrate our invention, without limiting it thereto:—

*Example 1.*—10 parts by weight of 4-chloro-aniline-3-sulphonic acid are gradually introduced while cooling into 50 parts by weight of chlorosulphonic acid. After standing for one hour, the reaction mixture is slowly heated on the water bath to 80–90° C. and maintained at this temperature for 8 hours. On cooling it is poured onto a large quantity of ice, whereupon the 4-chloro-aniline-3-sulphochloride of the formula

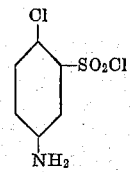

separates in the form of flakes. The latter are separated from the acid liquor by filtering and washing with ice water, dried on clay or filter paper and recrystallized from an appropriate solvent. The 4-chloroaniline-3-sulphochloride can also be separated from the acid liquor by extraction with ether, and the ethereal solution can be worked up in the known manner.

The 4-chloroaniline-3-sulphochloride forms colorless crystals, which gradually become colored. The compound is decomposed between about 80 and 90° C.

*Example 2.*—From 10 parts by weight of 2.5-dichloroaniline-4-sulphonic acid and 30 parts by weight of chlorosulphonic acid 2.5-dichloroaniline-4-s u l p h o c h l o r i d e of the formula

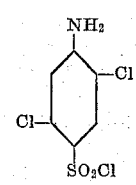

is obtained according to the method described in Example 1. It forms colorless crystals, melting at about 137–138° C.

*Example 3.*—10 parts by weight of 4.5-dichloroaniline-2-sulphonic acid and 40 parts by weight of chlorosulphonic acid yield when treated as above (Example 1) 4.5-dichloro-aniline-2-sulphochloride of the formula

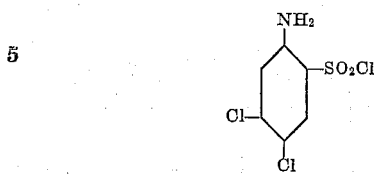

It forms pale yellowish colored crystals, melting at about 125–126° C.

*Example 4.*—10 parts by weight of 4-amino-1-methyl-benzene-3-sulphonic acid yield, when treated as in Example 1, with a mixture of 30 parts by weight of chlorosulphonic acid and 20 parts by weight of monohydrate 4-amino-1-methylbenzene-3-sulphochloride of the formula

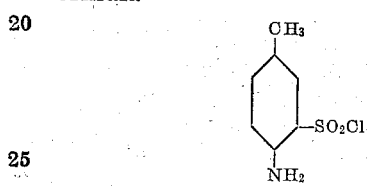

The compound forms coarse pale yellowish colored crystals, melting at about 85–86° C.

*Example 5.*—10 parts by weight of 2-chloro-4-amino-1-methylbenzene-5-sulphonic acid yield, when treated with 60 parts by weight of chlorosulphonic acid in the manner as indicated in Example 1, 2-chloro-4-amino-1-methylbenzene-5-sulphochloride of the formula

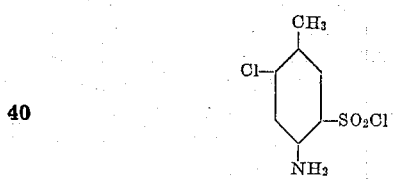

It forms coarse yellowish crystals, melting at about 127–128° C.

*Example 6.*—10 parts by weight of 3-chloro-2-amino-1-methylbenzene-5-sulphonic acid treated with 50 parts by weight of chlorosulphonic acid yield 3-chloro-2-amino-1-methylbenzene-5-sulphochloride of the formula

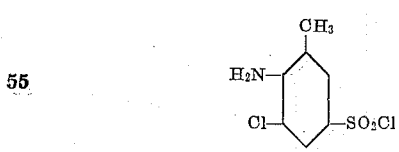

The compound forms yellowish colored crystals, melting at about 151–152° C; immediately above this temperature decomposition occurs.

*Example 7.*—10 parts by weight of 1.3-dimethyl-4-aminobenzene-5-sulphonic acid treated as in Example 1, with 50 parts by weight of chlorosulphonic acid yield 1.3-dimethyl-4-aminobenzene-5-sulphochloride of the formula

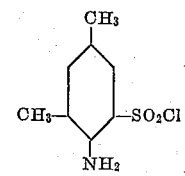

which compound forms yellow crystals, melting at about 85–86° C.

*Example 8.*—10 parts by weight of 1.3-phenylene-diamine-4.6-disulphonic acid yield, when treated with 50 parts by weight of chlorosulphonic acid, 1.3-phenylene-diamine-4.6-disulphochloride of the formula

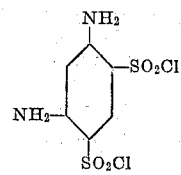

It forms small white needles, which decompose at about 185° C. after sintering.

*Example 9.*—From 10 parts by weight of 1-amino-3-hydroxybenzene-6-sulphonic acid and 60 parts by weight of chlorosulphonic acid, 1-amino-3-hydroxybenzene-4.6-disulphochloride of the formula

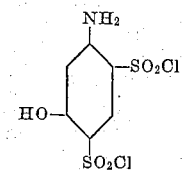

is obtained in the form of small crystals, possessing a silvery lustre and melting at about 181° C. with decomposition.

*Example 10.*—When 50 parts by weight of chlorosulphonic acid are caused to react as in Example 1, with 10 parts by weight of 1-naphthylamino-7-sulphonic acid, 1-naphthylamino-disulphochloride of the formula

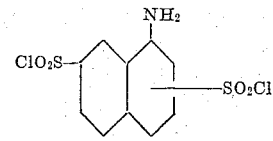

is produced. It forms yellowish crystals which melt at about 216–218° C. with decomposition.

*Example 11.*—50 parts by weight of aniline-o-sulphonic acid are introduced in small amounts in the course of about 2 hours while cooling into 250 parts by weight of chlorosulphonic acid. After standing for several days at ordinary temperature, for example, after 72 hours, the reaction mixture is poured onto a large quantity of ice, suitably with the addition of an acid binding agent, such as, for example, magnesium carbonate. Thereby the aniline-o-sulphochloride of the formula

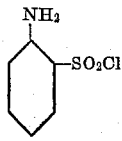

separates in the form of yellow flakes, which are taken up with ether and separated therefrom in known manner. They form yellow crystals, melting at about 72–74° C.

*Example 12.*—30 parts by weight of 2-amino-8-naphthol-3.6-disulphonic acid are introduced in the course of one hour while cooling into 250 parts by weight of chlorosulphonic acid. The reaction mixture is allowed to stand for several hours at room temperature, and then the temperature is slowly raised to about 100° C. and kept at this temperature for about 7 hours. After cooling the mass is poured onto ice while stirring, whereupon the 2-amino-8-naphthol-3.6-disulphochloride separates in form of yellowish flakes. It is sucked off, washed free from acid with ice water, dried and recrystallized from chlorobenzene. The yellow crystals thus obtained have no melting point, but become colored dark above 250° C.

The following table shows some further compounds obtainable according to the present process:—

| | | |
|---|---|---|
| From 6-chloroaniline-3-sulphonic acid. | There is produced. | 6-chloroaniline-3-sulphochloride: yellowish crystals (benzene) m. p. 77–80° C. |
| From 1-amino-6-methyl-2-chlorobenzene-5-sulphonic acid. | There is produced. | 1-amino-6-methyl-2-chlorobenzene-5-sulphochloride: colorless crystals (acetone) m. p. 154–155° C. |
| From 2-nitraniline-4-sulphonic acid. | There is produced. | 2-nitraniline-4-sulphochloride: yellow crystals (ether) m. p. 149–150° C. |
| From 3-nitraniline-4-sulphonic acid. | There is produced. | 3-nitraniline-4-sulphochloride: yellow crystals (chlorobenzene) m. p. 136° C. |
| From 1-chloro-2-naphthylamine-6-sulphonic acid. | There is produced. | 1-chloro-2-naphthylamino-6-sulphochloride: yellow crystals (ether) m. p. 152–153° C. |
| From 1.2-aminonaphthol-4-sulphonic acid. | There is produced. | 1-amino-dichloronaphthalene-4-sulphochloride: yellow crystals (ether) m. p. 204–205° C. |
| From 4.4'-diaminodiphenyl-3.3'-disulphonic acid. | There is produced. | 4.4'-diamino-dichlorodiphenyl-3.3'-disulphochloride: colorless crystals (benzene) m. p. 76° C. |
| From 4.4'-diamino-diphenyl-2.2'-disulphonic acid. | There is produced. | 4.4'-diamino-dichlorodiphenyl-2.2'-disulphochloride: colorless crystals (benzene) m. p. 132–133° C. |

We claim:—

1. The process which comprises causing chlorosulphonic acid to act upon an amino sulphonic acid of the benzene or naphthalene series at a temperature ranging between about 15° C. and about the boiling point of the reaction mixture, for several hours.

2. The process which comprises causing chlorosulphonic acid to act upon an amino-naphthol sulphonic acid at a temperature ranging between about 15° C. and about the boiling point of the reaction mixture, for several hours.

3. As new products amino sulphochlorides which may be represented by the following general formula

wherein R stands for a radical of the benzene or naphthalene series, and $x$ stands for one of the numbers 1 and 2, said compounds being generally colorless to yellow crystalline substances, soluble in organic solvents, being saponified to form amino sulphonic acids when boiled with aqueous alkalies and being valuable intermediate products for the manufacture of coal tar dyestuffs and pharmaceutical substances.

4. As new products naphthylamino-sulphochlorides which may be represented by the following general formula

wherein R stands for a naphthalene nucleus which may be substituted by substituents selected from the group consisting of halogen and the hydroxy group, and $x$ stands for one of the numbers 1 and 2, said compounds being generally colorless to yellow crystalline substances, soluble in organic solvents, being saponified to form the amino sulphonic acids when boiled with aqueous alkalies and being valuable intermediate products for the manufacture of coal-tar dyestuffs and pharmaceutical substances.

5. As a new product the compound of the probable formula:

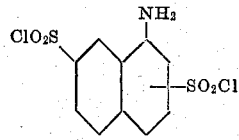

forming yellowish crystals, decomposing while melting at about 216 to 218° C.

6. As a new product, 2-amino-8-naphthol-3.6-disulphodichloride, forming yellowish crystals which have no definite melting point but become dark colored when heated above 250° C.

In testimony whereof, we affix our signatures.

HUGO SCHWEITZER.
WINFRID HENTRICH.
KARL BURR.